No. 767,624. PATENTED AUG. 16, 1904.
C. H. BEDELL & T. S. BAILEY.
MEANS FOR CLEARING THE OPTICAL PARTS OF ALTISCOPES OR THE LIKE.
APPLICATION FILED JULY 15, 1903.
NO MODEL. 3 SHEETS—SHEET 3.

WITNESSES:

INVENTORS:
Charles H Bedell
Theodore S. Bailey
by Henry Connett
ATTORNEY.

No. 767,624. Patented August 16, 1904.

UNITED STATES PATENT OFFICE.

CHARLES H. BEDELL, OF PHILADELPHIA, PENNSYLVANIA, AND THEODORE S. BAILEY, OF GREENPORT, NEW YORK, ASSIGNORS TO ELECTRIC BOAT COMPANY, OF NEW YORK, N. Y., A CORPORATION OF NEW JERSEY.

MEANS FOR CLEARING THE OPTICAL PARTS OF ALTISCOPES OR THE LIKE.

SPECIFICATION forming part of Letters Patent No. 767,624, dated August 16, 1904.

Application filed July 15, 1903. Serial No. 165,708. (No model.)

*To all whom it may concern:*

Be it known that we, CHARLES H. BEDELL, of Philadelphia, Pennsylvania, and THEODORE S. BAILEY, of Greenport, Suffolk county, New York, citizens of the United States, have jointly invented certain new and useful Improvements in Means for Clearing the Optical Parts of Altiscopes or the Like, of which the following is a specification.

This invention releates to means for removing moisture from the lenses, prisms, &c., of altiscopes, periscopes, and the like used in the navigation of submarine boats and for keeping them dry and clear. It is well known that where an optical instrument is used on this class of boats or vessels the moisture present in the tube of the instrument, and which is unavoidably present in most cases, is subject to condensation under the influence of changes of temperature and is then liable to be deposited on the surfaces of the lenses, prisms, &c., so as to cloud the same; and this invention has for its object a means for drying air and forcing it in a dry state through the optical tube and over the clouded surfaces, so that the dry air may take up the condensed moisture and clear these surfaces of the instrument. Obviously also the dry air will displace any moisture-laden air in the tube, and thus prevent further condensation.

Figure 1:
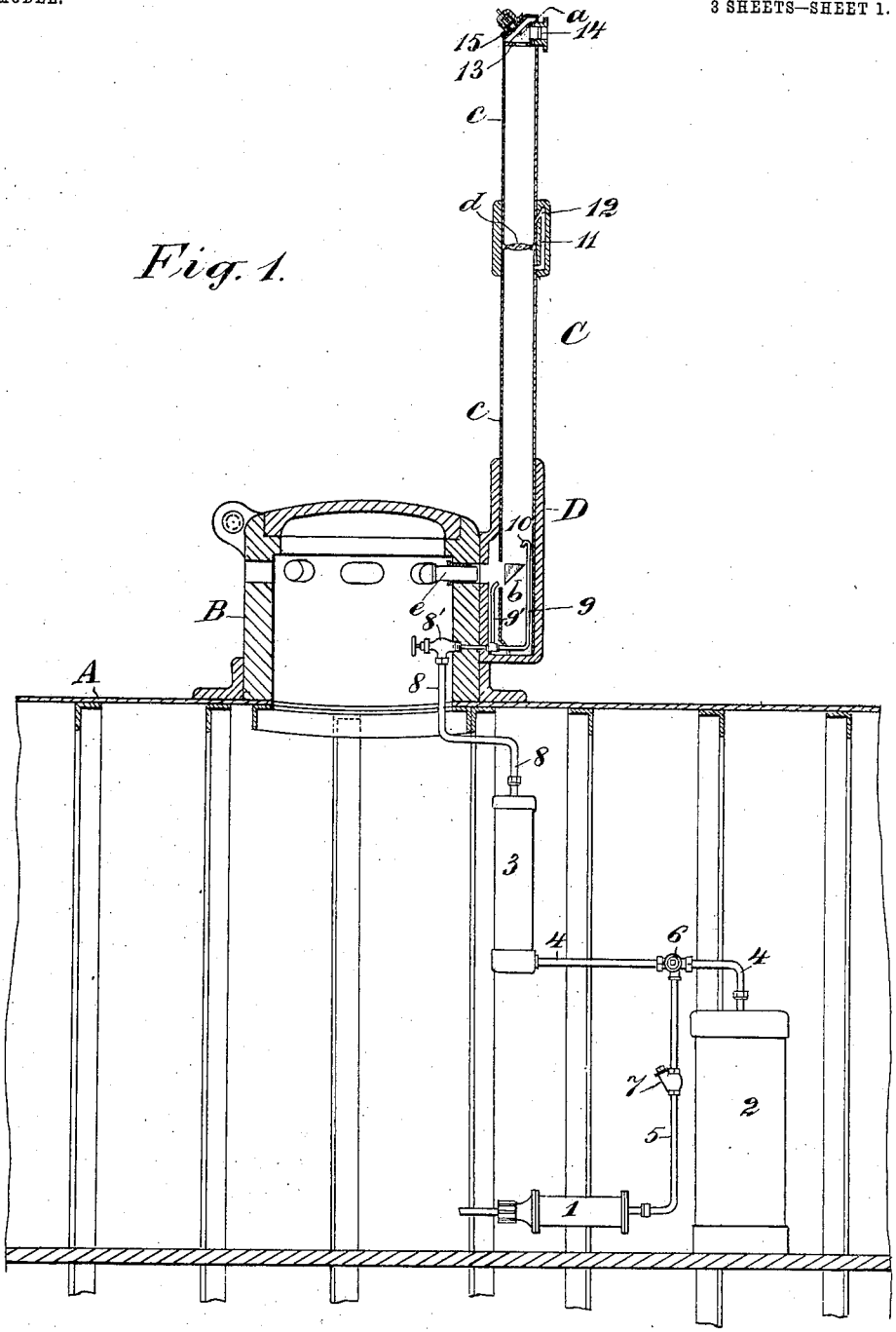
Figure 2:
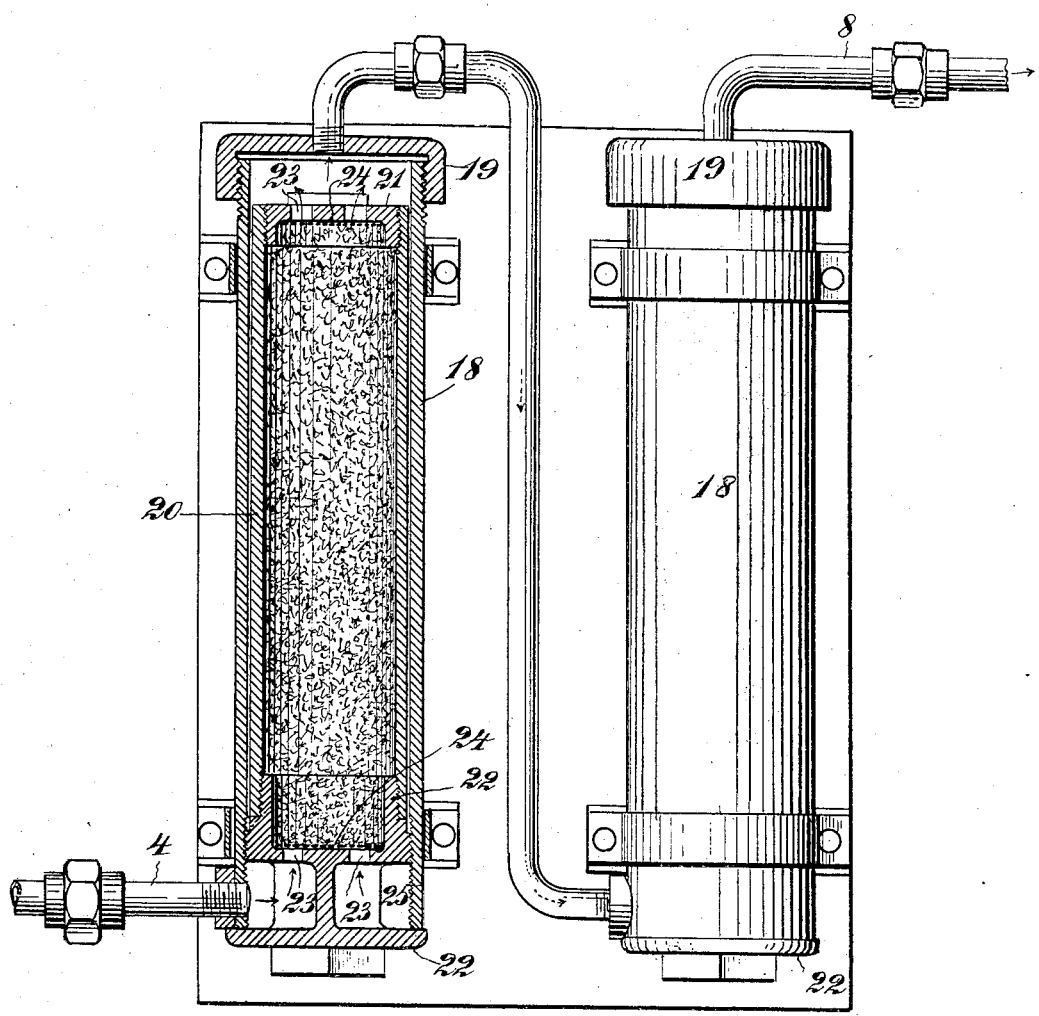
Figure 3:
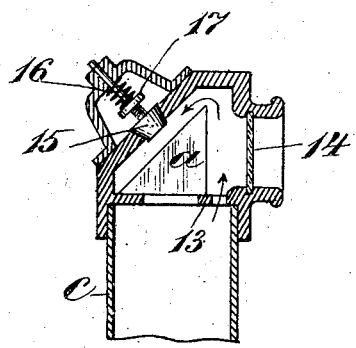
Figure 5:
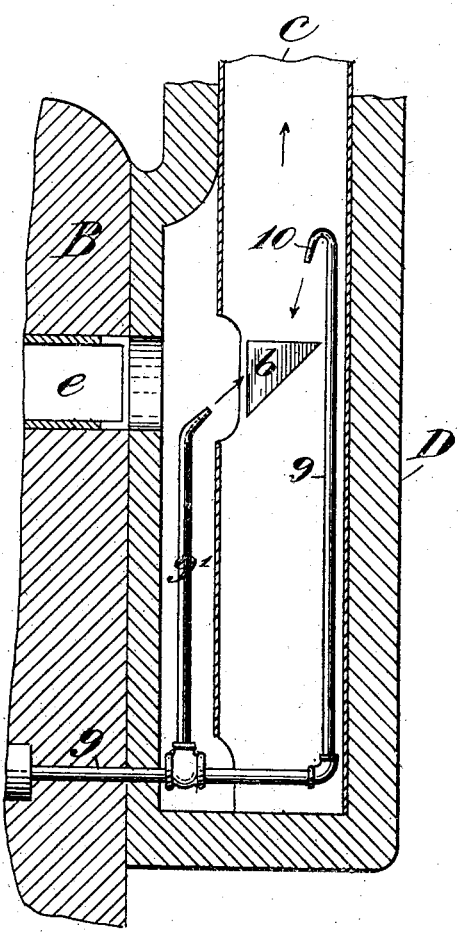
Figure 4:
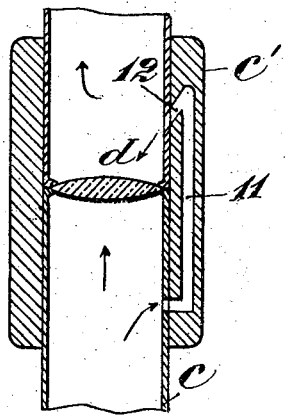

In the drawings which serve to illustrate our invention, Figure 1 is a sectional view of a part of a submarine boat, showing the application of the invention to the altiscope thereof. Fig. 2 is an enlarged sectional view of the preferred form of the air-drying device. Figs. 3, 4, and 5 are enlarged sectional detail views of parts of the optical tube.

A designates a part of the hull of a submarine boat, and B the turret thereof. At the side of the turret is mounted the altiscope C in a socket D. In the optical tube $c$ of the altiscope are mounted the usual prisms $a$ $b$ and lens $d$. From the conning-tower the image received by the upper prism $a$ and deflected downward to the prism $b$ is observed through a telescope $e$. So far as described the construction is one already known.

This invention provides means, now to be described, for preventing the condensation of moisture in the tube $c$, and particularly on the surfaces of the lens $d$ and prisms $a$ and $b$.

1 is a pump of any kind for compressing air.

2 is a compressed-air reservoir, and 3 is a drier for the air.

4 is a pipe which conveys the compressed air or other gas from the reservoir 2 to the drier 3, and 5 is a pipe leading from the eduction side of the pump 1 to a multiple-way cock 6, which connects the pipe 5 with the pipe 4. This cock 6 permits the air or gas under pressure to flow from the reservoir to the drier, from the pump to the drier, or from the pump to the reservoir at will. In the pipe 5 is a check-valve 7.

After passing through the drier the air flows through a pipe 8 up into the turret to a cock 8', which controls its flow, thence to the optical tube $c$ through a pipe 9. This latter pipe extends up in the tube $c$ to a point just above the lower prism $b$, where it has a downwardly-directed discharge-nozzle 10, whereby the dry air flowing in is discharged directly down onto the said prism $b$.

A branch 9' from the pipe 9 extends up in the space between the wall of the socket D and the lower part of the optical tube and discharges dry air on the vertical face of the prism $b$. These features are best seen in the enlarged detail view of this part, Fig. 5.

The dry air flows upward in the optical tube and impinges first upon the lower face of the lens $d$ and then flows by said lens through a by-pass 11 to the tube above the lens. The upper end of said by-pass, which is formed in the coupling $c'$ of the tube, has a downwardly-directed portion 12 at its upper end to cause the air to be discharged directly onto the upper face of the lens. After passing the lens the dry air flows up to and through the diaphragm 13 (see Fig. 3) at the upper prism $a$, along the front of the said prism, and between it and the glass 14, through which the image enters, and thence to a check-valve 15 in the cap-plate of the optical tube, where it passes out. This check-valve, which controls the escape of the dry air from the optical tube to the atmosphere, is backed by a regulable spring 16, whereby the dry air may be kept in the optical tube at any desired pressure within reasonable limits above that of the atmosphere, and thus prevent the entry of moist air from the outside. The spring may be regulated as to tension in any way desired. The means shown comprises a nut 17 on the screw-threaded stem of the valve.

In Fig. 1 only one chamber or vessel is shown in the drier 3; but there may be any number of them, through which the air to be dried can pass in succession. In Fig. 2, where the drier is seen more in detail, there are two of these vessels, which are alike. In this figure 18 designates the outer cylinder, closed at the top by a screw-cap 19. At the bottom of this cylinder is inserted a retort or holder for a deliquescent salt or chemical—such as calcium chlorid, for example. This holder consists of tube 20, with a screw-plug 21 in its upper end and a screw-plug 22 in its lower end. These plugs have in them apertures 23 for the passage of air and fine gauze sheets 24, covering said apertures to prevent the escape of the salt. The lower cap 22 has a part which screws into the end of the cylinder 19, and a space 25 is formed in it for the entry of air which flows up through the salt in the tube. The retort may be removed at will for recharging with salt.

The particular form of drier shown is not specifically claimed herein nor is this invention limited to the use of this form of drier.

Having thus described our invention, we claim—

1. The combination with the optical tube of an altiscope or the like, of a source of compressed air, an air-drier connected therewith, a pipe connecting said drier with the lower part of said optical tube, and a regulable spring check-valve controlling an outlet for the air at the top of said tube.

2. The combination with the optical tube, provided with an outlet for air at its top controlled by a regulable spring check-valve, and the lower prism $b$ in the tube, of means for drying air and forcing it into the tube, and the pipes 9 and 9' adapted to direct the dried air directly onto the faces of said prism.

3. The combination with the optical tube, provided with a valve-controlled outlet at its top, the lens $d$ in said tube, and the by-pass about said lens, said by-pass having a downwardly-directed portion above the lens, of means for compressing and drying air and delivering same to the lower part of the optical tube.

4. The combination with the optical tube, provided with a prism $a$, inclosed in its upper end, with a glass-covered aperture to admit the image to said prism, and with a valve-controlled outlet for the air above said prism, of means for compressing and drying air, and forcing said air into the lower part of said tube.

In witness whereof we have hereunto signed our names, this 7th day of July, 1903, in the presence of two subscribing witnesses.

CHARLES H. BEDELL.
THEODORE S. BAILEY.

Witnesses:
  FRANK TAYLOR CABLE,
  WILLIAM R. SANDS.